United States Patent [19]

Yasuda et al.

[11] Patent Number: 4,979,895
[45] Date of Patent: Dec. 25, 1990

[54] PROCESS FOR FIRING CERAMIC SHAPED BODIES AND FIRING TOOLS USED THEREFOR

[75] Inventors: Keiji Yasuda, Aichi; Masahumi Yamaguchi, Chita; Kazuhiro Miyahara, Nagoya, all of Japan

[73] Assignee: NGK Insulators, Ltd., Japan

[21] Appl. No.: 330,379

[22] Filed: Mar. 29, 1989

[30] Foreign Application Priority Data

Mar. 29, 1988 [JP] Japan .................................. 63-73463

[51] Int. Cl.⁵ .............................................. F27D 5/00
[52] U.S. Cl. ...................................... 432/10; 432/241
[58] Field of Search ............... 432/241, 137, 141, 148, 432/10

[56] References Cited

U.S. PATENT DOCUMENTS 4,772,199  9/1988  Hartmann ...................... 432/241 X Primary Examiner—Henry A. Bennet
Attorney, Agent, or Firm—Parkhurst, Wendel & Rossi

[57] ABSTRACT

A process for firing ceramic shaped bodies is disclosed, which comprises the steps of placing the ceramic shaped bodies on a truck, and firing the shaped bodies with a combustion gas. Shield members are arranged on the truck such that a jet stream of the combustion gas will not directly contact the ceramic shaped bodies and that a path for the combustion gas jet stream may be formed on the truck. The shield member may be obliquely divided into two sections at the central portion thereof.

3 Claims, 6 Drawing Sheets

FIG_1
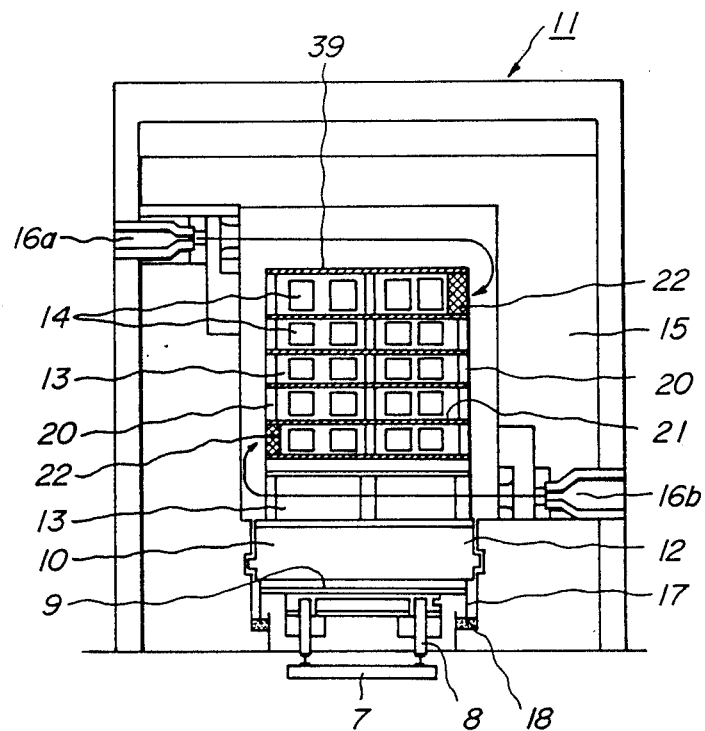

FIG_2
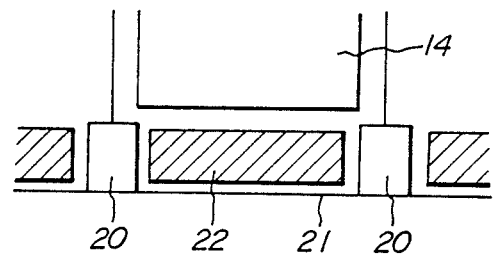
FIG_3
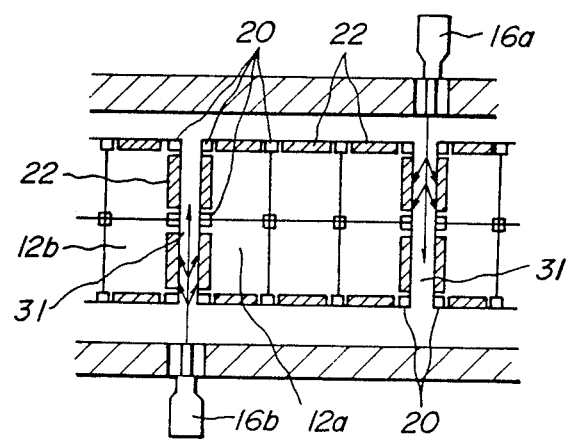

FIG_4A
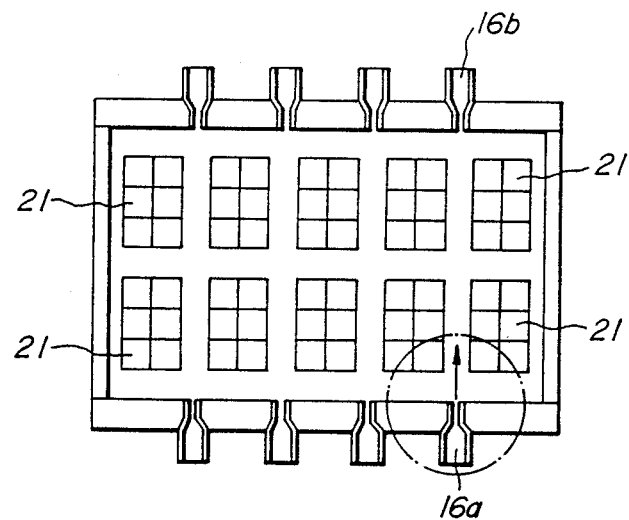
FIG_4B
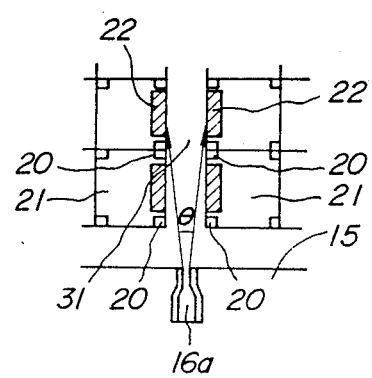

FIG_5
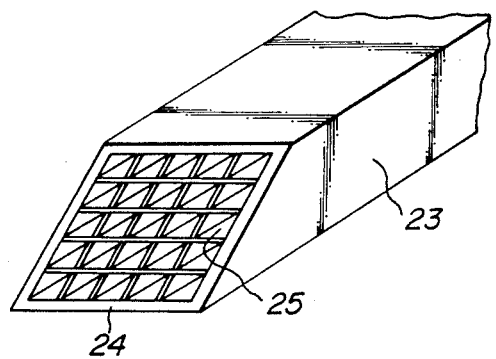
FIG_6
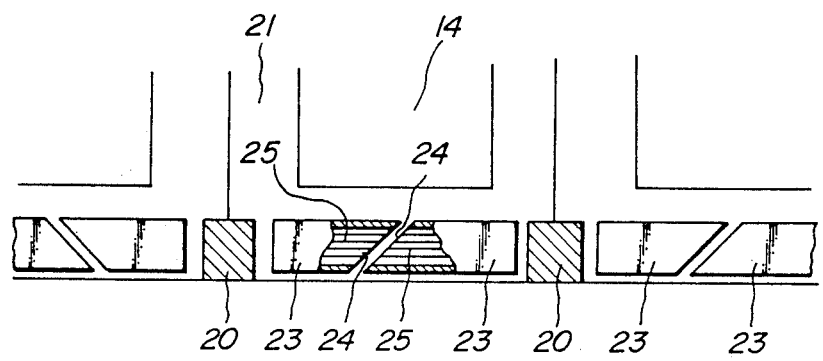

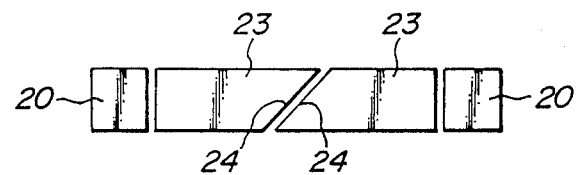
FIG_7
FIG_8
PRIOR ART
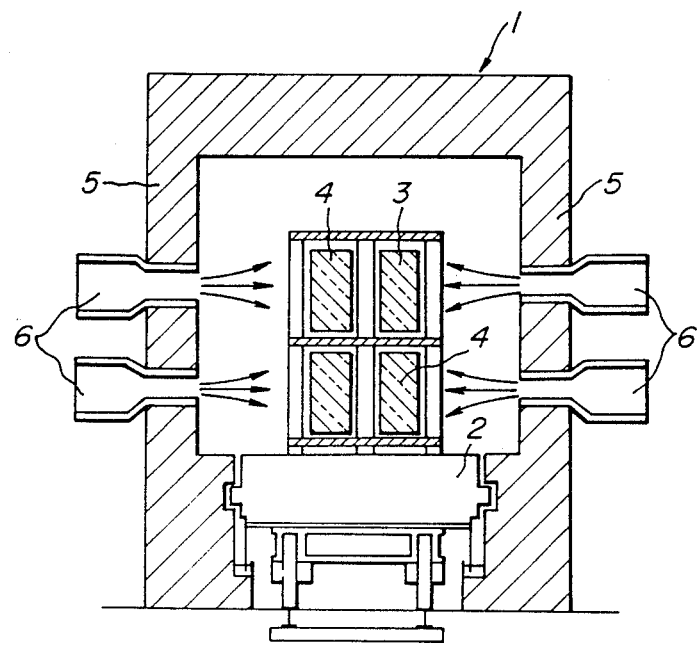

FIG_9
*PRIOR ART*
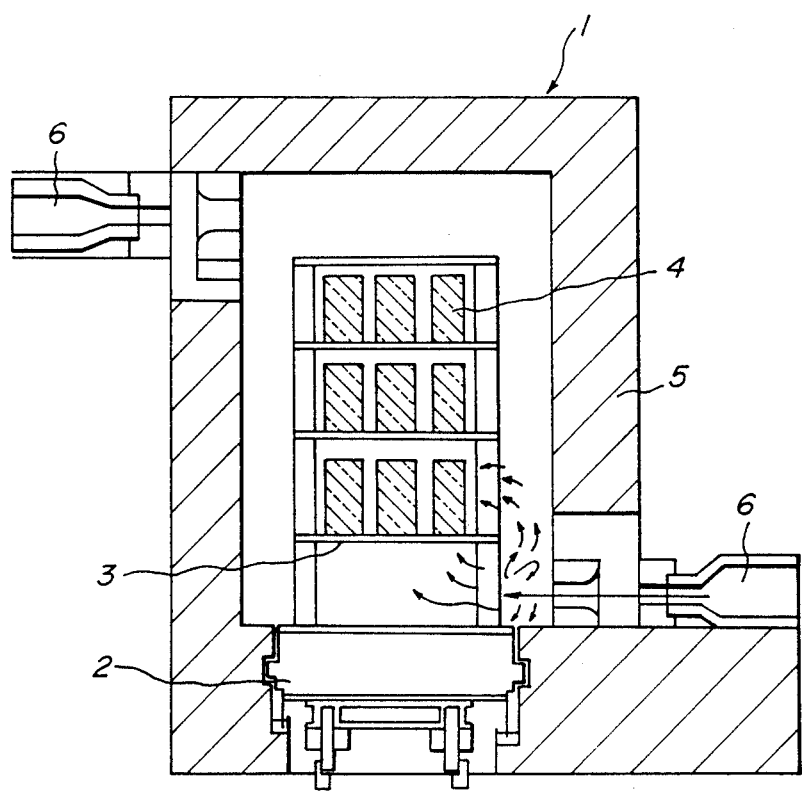

PROCESS FOR FIRING CERAMIC SHAPED BODIES AND FIRING TOOLS USED THEREFOR

BACKGROUND OF THE INVENTION (1) Field of the Invention

The present invention relates to a process for firing ceramic shaped bodies and firing tools used therefor.

(2) Related Art Statement

Ceramic shaped bodies, which are prepared by mixing a ceramic raw material with an appropriate firing aid and then extruding a ceramic body thus obtained, are conventionally fired as follows:

For example, as shown in FIG. 8, a plurality of ceramic shaped bodies 4 are sidewisely inserted and put onto shelves 3 on a truck 2 inside a tunnel kiln (or a periodic kiln), and the shaped bodies are fired by heating a kiln-inside atmosphere to a given temperature by means of burners extending through side walls 5 of the kiln 1. Such a firing kiln is generally called "side firing system".

As shown in FIG. 9, an under firing system in which burners 6 are located at upper and lower portions of side walls of a kiln has also been used as the firing kiln.

However, in the above-mentioned ceramic firing processes, since ceramic shaped bodies are exposed directly to a combustion gas jet stream, the shaped bodies are partially melted away or locally thermally deformed. For instance, when ceramic shaped bodies are honeycomb structural bodies made of cordierite, they are generally fired at about 1,400° C. On the other hand, since the melting point of the honeycomb structural body is about 1,450° C., they are partially melted away at a place where a combustion gas jet stream directly contacts the body. That is, in the case of the side firing system in FIG. 8, combustion gas jet streams from the burners as shown by arrows directly contact the ceramic shaped bodies 4 through openings provided on sides of the shelves. In the under firing system in FIG. 9, combustion gas jet streams pass above or under the shelves 3, are reflected by the side walls 5, and contact the ceramic shaped bodies through openings defined by the shelves 3. In both the side firing system and the under firing system, the combustion gas jet stream passes through a gap between the shelves. Thereby, ceramic shaped bodies arranged near the gap are influenced, or combustion gas jet streams are impinged upon supports provided on the truck during movement of the truck and the gas jet stream becomes a turbulent so that the gas jet stream directly contacts the ceramic shaped bodies. On the other hand, with respect to shaped bodies even inside the same shelf, there are naturally variations between products which are obtained while contacting directly with the combustion gas jet streams and other shaped bodies.

In particular, when the ceramic shaped body is of a honeycomb structure, a number of through holes are defined by thin walls. Thus, not only the melt away and thermal deformation of the outer peripheral portion of the honeycomb structural body occur, but also shrinkage deformation or cuts of the thin walls due to difference in temperature between the inside and outside of the honeycomb structure bodies.

SUMMARY OF THE INVENTION

It is an object of the present invention to solve the above-mentioned problems, and to provide a process for firing ceramic shaped bodies with fewer variations in product quality as well as firing tools used therefor.

According to the present invention, shield members are arranged on a truck to prevent a combustion gas jet stream of a burner from directly contacting ceramic shaped bodies, and a path for the combustion gas jet stream is defined on the truck by the shield members.

According to a further aspect of the present invention, there is a provision of such a shield member as a firing tool which is to be used in the above firing process, the shield member being a ceramic honeycomb structural body in which a central portion is obliquely divided.

Preferably, as the shield member for the above firing, use may be made of ceramic honeycomb structural bodies having through holes extending orthogonal to the direction of the combustion gas jet stream.

In the present invention, since the shield members are arranged so that the combustion gas jet streams may be prevented from directly contacting the ceramic shaped bodies to be fired, the combustion gas jet streams do not directly reach the the ceramic shaped body, the shaped body is not partially melted away or unfavorably deformed, and the fired body having excellent quality can be obtained.

In addition, the second aspect of the present invention relates to the shield member as the firing tool, which is designed as a honeycomb structure obliquely divided, the shield member is lightened. Moreover, since the firing tool is separatedly arranged in a divided fashion so that the inserting operation can be facilitated. Further, the dimension of the shield member can be increased or decreased by staggering the divided sections along the cut faces. Thus, even if a space of supports varies, the dimension can appropriately be adjusted.

Furthermore, since the cut faces are oblique, the combustion gas jet streams from the burners do not directly reach the shaped bodies.

These and other objects, features and advantages of the invention will be appreciated upon reading the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a firing kiln for effecting the firing process according to the present invention;

FIGS. 2 and 3 are schematic views illustrating arrangement of the shield members according to the present invention;

FIG. 4(A) is a top view of a periodic kiln for effecting the process according to the present invention;

FIG. 4(B) is a partially enlarged view of FIG. 4(A);

FIG. 5 is a perspective view of an embodiment of the shield member as a firing tool according to the present invention;

FIG. 6 is a schematic view illustrating arrangement of the shield members of FIG. 5 on the truck in the firing kiln;

FIG. 7 is a top view illustrating arrangement of the shield member according to the present invention; and FIGS. 8 and 9 are sectional views of a conventional firing kiln used for firing ceramic shaped bodies.

DETAILED DESCRIPTION OF THE INVENTION

The firing process according to the present invention will be explained in more detail with reference to the attached drawings.

FIG. 1 shows a tunnel kiln 11 for firing ceramic honeycomb structural bodies. A truck 12 is movably arranged in the tunnel kiln 11. Shelves 13 are arranged on the truck 12.

Burners 16a, 16b are provided in the tunnel kiln 11 penetrating walls 15 thereof. The burners 16a, 16b are arranged through the kiln walls, for instance, above the uppermost stage of the shelves 13 and in parallel with the lowermost stage of the shelves while being horizontally staggered and opposed to each other, so that the combustion gas jet streams may be circulated.

The truck 12 is constituted by a truck frame 9 rotatably supporting wheels 8, which slide on rails 7 on a bottom of the kiln, and a table 10 formed by piling refractory blocks on the truck frame 9. Sand-sealable iron plates 17 are provided at the truck 12, while a part of each of the sand-sealable iron plates 17 is buried in sand inside a sand-receiving grooves 18 of kiln walls 15. The sand-sealable iron plate moves together with the truck. Thus, the combustion gas jet streams, tar, etc. are prevented from entering the side of the wheels 8 by means of the iron plates 17.

In the shelves 13, the respective stages are spaced by means of supports 20 at a given vertical interval. That is, a space sufficient enough to place ceramic shaped bodies 14 on the shelves is assured. When the ceramic shaped bodies 14 to be fired are to be placed on the shelves 13, ceramic shaped bodies are not placed on the lowermost stage of the shelves 13, which is horizontally in flush with the burners 16b. The reason is that the combustion gas jet streams from the burners 16a, 16b are circulated through the lowermost shelf so that the entire shelves may uniformly be heated as much as possible, and that if the combustion gas jet streams directly hit upon the ceramic shaped bodies, they will melt.

In the thus constructed firing kiln, the combustion gas jet streams ejected from the burners 16a, 16b hit the opposed kiln walls and turn back therefrom so that they widely disperse in every direction as a turbulent flow, and that a part of the turbulent flow is likely to enter the uppermost and lowermost stages of the shelves 13. In order to prevent the entering of the turbulent flow of the combustion gas jet streams, shield members 22 are arranged, as firing tools, opposed to the ceramic shaped bodies 14 located on the shelves between the supports 20, 20 put on the truck as shown in FIGS. 1 and 2.

In the tunnel kiln, as shown in FIG. 3, since a space between shelves 12a, 12b serves as a path for the combustion gas jet stream from the burner 16, the shield members 22 are arranged between the poles 20,20 facing this path to form a combustion gas jet stream path 31.

The above explanation has been made with respect to the process for firing ceramic shaped bodies by using the tunnel kiln, but is also applicable to a periodic kiln.

For instance, as shown in FIGS. 4(A) and (B), spaces are provided between shelf plates 21, and ceramic shaped bodies are fired by ejecting combustion gas jet streams into the spaces through the gas burners 16a, 16b as shown by an arrow. In this case, when the jet stream has a given angle (In FIG. 4(B), $\theta$ is the ejecting angle of the burner), the shield members 22 may be arranged at locations where the jet streams intersect with the shelf plates 21.

A path for the combustion gas jet stream is formed between the shelf plates 21, 21 between which the shield members 22 are arranged.

Next, the shield member used in the present invention, which prevents the combustion gas jet stream from contacting the ceramic shaped bodies, will be explained below with reference to the attached drawings.

The shield member 22 in FIGS. 1 through 4 is made of a ceramic material having thermal shock resistance and refractoriness, for instance, a mullite base ceramic, a cordierite base ceramic, an alumina base ceramic, or the like.

The shape of the shield member is solid, hollow, honeycomb, or the like. It is preferable that the side faces of the shield member have a flat surface. The reason is that the wall surfaces of the shield member serve as a source for generating heat radiation during firing depending upon its heat capacity. When the heat radiation-generating source is the flat wall surface, it is possible to uniformly and indirectly heat the ceramic shaped bodies. When the shield member is hollow, a space inside the shield member not only acts as a heat-insulating layer, but also the heat capacity lowers to improve heat efficiency.

Preferably, the shield member is designed in the form of a honeycomb structure from the sandpoint of arranging the shield member onto the truck and heat efficiency. As shown in FIG. 5, a honeycomb shield member 23, which is produced by shaping a mullite base body, a cordierite base body, an alumina base body, or the like, and firing the shaped body, is obliquely cut at the central portion thereof. Therefore, the cut face exhibits a honeycomb structure. Through holes 25 positioned at an end opposed to the cut face 24 may be opened or sealed. The shape of the through holes 25 may be rectangular, round, hexagonal, or the like.

Since the ceramic honeycomb shield member has ample spaces therein, the spaces function as heat insulating layers. On the other hand, since the honeycomb structural body has small heat capacity, its heat efficiency is good.

As shown in FIG. 6, when the honeycomb shield member 22 is to be arranged between the supports 20, 20 on the shelf plate 21 upon which ceramic shaped bodies 14 are placed, one of halves 23 of the shield member is arranged on a side of one of the support such that cut face 24 faces forward, and then the other half 23 is arranged on the side of the other support such that its cut face 24 faces the cut face 24 of the former one. As compared with a conventional case where a heavy plate member is inserted into a narrow space, this operation is easy, and not so difficult working is required. In addition, even if the space between the supports varies, as shown in FIG. 7, the length of the shield member can be adjusted to an appropriate value by slipping the halves along their cut faces 24. In order that the through holes 25 of the honeycomb structure may function to uniformly transmit heat from the burner, they are preferably arranged between the supports in a direction orthogonal to flames from the burner as shown in FIG. 6.

As is obvious from the foregoing explanation, according to the firing process of the present invention, by using the shield members, the combustion gas jet stream ejected from the burner will not directly reach the ceramic shaped bodies, the path for the combustion gas jet stream is provided on the truck, and the ceramic shaped bodies such as honeycomb structural bodies are uniformly fired while the jet stream is circulated inside the truck. Thus, the shaped bodies can stably be fired without being melted away or deformed. Therefore, products having few quality variations and excellent yield can be obtained.

Further, when the shield member according to the present invention as the firing tool is designed in the form of a honeycomb structure and obliquely divided, the whole weight of the shield member can be reduced, and also the weight of each of the divided sections can be reduced. Therefore, easier arrangement of the firing tools can be attained due to this diversion.

Furthermore, the dimension of the shield member can be adjusted depending upon the space between the supports by staggering the obliquely divided shield sections along the cut faces. Further, since the cut faces obliquely extend, the combustion gas jet stream from the burners will not directly reach the shaped bodies through between the cut faces. Thus, stable firing can be effected.

What is claimed is:

1. A shield member for use for firing ceramic shaped bodies on a truck with a combustion gas jet stream, said shield member being arranged as a firing tool on the truck such that a jet stream of the combustion gas will not directly contact the ceramic shaped bodies and a path for the combustion gas jet stream is formed on the truck, wherein the shield member is obliquely divided at a central portion thereof.

2. The shield member according to claim 1, wherein the shield member is a ceramic honeycomb structural body having through holes extending at right angles relative to a direction in which the combustion gas jet stream flows.

3. A process for firing ceramic shaped bodies, comprising the steps of placing the ceramic shaped bodies on support shelves of a truck and firing the shaped bodies with a combustion gas, wherein said truck has a first pair of sides arranged parallel to a direction in which a jet-stream of said combustion gas flows and a second pair of sides arranged perpendicular to said direction, and shield members are arranged on all sides of said truck such that the jet-stream of the combustion gas does not directly contact the ceramic shaped bodies and a path for the combustion gas jet-stream is formed on the truck.

* * * * *